(12) United States Patent
Reuss et al.

(10) Patent No.: US 7,359,504 B1
(45) Date of Patent: Apr. 15, 2008

(54) METHOD AND APPARATUS FOR REDUCING ECHO AND NOISE

(75) Inventors: Edward L. Reuss, Santa Cruz, CA (US); William A. Weeks, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 868 days.

(21) Appl. No.: 10/309,695

(22) Filed: Dec. 3, 2002

(51) Int. Cl.
*H04M 9/08* (2006.01)

(52) U.S. Cl. ............... 379/406.02; 379/406.01

(58) Field of Classification Search ............... 379/406.01–406.16
See application file for complete search history.

(56) References Cited

U.S. PATENT DOCUMENTS

| | | | |
|---|---|---|---|
| 5,809,463 A * | 9/1998 | Gupta et al. | 704/233 |
| 5,920,834 A | 7/1999 | Sih et al. | |
| 5,960,077 A * | 9/1999 | Ishii et al. | 379/406.08 |
| 6,031,938 A * | 2/2000 | Kajiwara | 382/239 |
| 6,035,034 A * | 3/2000 | Trump | 379/406.06 |
| 6,061,023 A | 5/2000 | Daniel et al. | |
| 6,151,397 A | 11/2000 | Jackson, Jr. II et al. | |
| 6,178,248 B1 | 1/2001 | Marash | |
| 6,192,126 B1 | 2/2001 | Koski | |
| 6,201,499 B1 | 3/2001 | Hawkes et al. | |
| 6,236,862 B1 * | 5/2001 | Erten et al. | 455/501 |
| 6,243,471 B1 | 6/2001 | Brandstein et al. | |
| 6,301,357 B1 | 10/2001 | Romesburg | |
| 6,408,978 B1 | 6/2002 | Premus | |
| 6,415,029 B1 | 7/2002 | Piket et al. | |
| 6,420,975 B1 | 7/2002 | DeLine et al. | |
| 6,707,912 B2 * | 3/2004 | Stephens et al. | 379/406.08 |

* cited by examiner

*Primary Examiner*—Curtis A Kuntz
*Assistant Examiner*—Alexander Jamal
(74) *Attorney, Agent, or Firm*—Intellectual Property Law Office of Thomas Chuang

(57) ABSTRACT

The present invention provides a solution to the needs described above through a method and apparatus for reducing echo and noise. The apparatus includes a microphone array for receiving and audio signal, the audio signal including a voice signal component and a noise signal component. The apparatus further includes a voice processing path having an input coupled to the microphone array and a noise processing path having an input coupled to the microphone array. The voice processing path is adapted to detect voice signals and the noise processing path is adapted to detect noise signals. A first echo controller is coupled to the voice processing path and a second echo controller is coupled to the noise processing path. A noise reducer is coupled to the output of the first echo controller and second echo controller.

24 Claims, 4 Drawing Sheets

METHOD AND APPARATUS FOR REDUCING ECHO AND NOISE

TECHNICAL FIELD

The present invention relates to the general field of signal processing. More specifically the invention relates to audio quality in telecommunications.

BACKGROUND

Headset and other telephonic device designs used for telephony must deal with the acoustic response from device speakers being detected by the device microphone and then sent back to the far-end speaker, which after the delays inherent in any telecommunications circuit may be detected by the far-end user as an echo of their own voice. Here, the "transmit signal" refers to the audio signal from a near end user, e.g. a headset wearer, transmitted to a far-end listener. The "receive signal" refers to the audio signal received by the headset wearer from the far-end talker. In the prior art, one solution to this echo problem was to ensure the acoustic isolation from the headset speaker to the headset microphone is so great as to render any residual echo as imperceptible. For example, one solution is to use a headset with a long boom to place the microphone near the user's mouth.

However, such a headset may be uncomfortable to wear or too restrictive in certain environments. Furthermore, many applications require a headset design that cannot achieve the acoustic isolation required, such as a headset with a very short microphone boom used in either cellular telephony or Voice over Internet Protocol (VoIP), or more generally Voice over Packet (VoP) applications. In these applications, the delay through the telecommunications network can be hundreds of milliseconds, which can make even a small amount of acoustic echo annoying to the far-end user. The required acoustic isolation is more difficult to achieve with boomless headsets, hands-free headsets, speaker-phones, and other devices in which a microphone and speaker may be in close proximity. One solution described in the prior art has been to utilize an echo cancellation technique to reduce the acoustic echo. Such techniques are discussed for example, in U.S. Pat. No. 6,415,029 entitled "Echo Canceler and Double-Talk Detector for Use in a Communications Unit." However, such techniques focus on the voice signal alone as opposed to acoustic echo in the noise sources, thereby limiting their effectiveness.

Headset and other telephonic device designs must also deal with background noise, caused by a variety of noise sources in the headset wearer's vicinity, such as other people conversing nearby, wind noise in an automobile, machinery & ventilation noise, loud music and intercom announcements in public places. These sources may either be diffuse or point noise sources. In the prior art, such acoustic interference is normally managed by the use of a long microphone boom, which places the microphone as close as possible to the user's mouth, a voice tube, which has the same effect as a long boom, or a noise canceling microphone, which enhances the microphone response in one direction oriented towards the user's mouth and attenuates the response from the other directions. However, for many applications these solutions are either inadequate, such as very high noise environments, or are not compatible with the stylistic and user comfort requirements on the headset, such as a headset with a short microphone boom. Also, when using noise-canceling microphones, if the microphone is not properly positioned—as is often the case—the noise reducing mechanism is rendered useless. In these cases, additional background noise reduction is required in the microphone output signal.

Thus, there has been a need for improvements in the reduction of acoustic echo and reduction of background noise. More specifically, there has been a need for improved systems and methods for echo cancellation and noise reduction techniques.

SUMMARY OF THE INVENTION

The present invention provides a solution to the needs described above through an apparatus and method for reducing acoustic echo and background noise.

The present invention provides an apparatus for processing a signal. The apparatus includes a microphone array for receiving an audio signal, the audio signal including a voice signal component and a noise signal component. The apparatus further includes a voice processing path having an input coupled to the microphone array and a noise processing path having an input coupled to the microphone array. The voice processing path is adapted to detect voice signals and the noise processing path is adapted to detect noise signals. A first echo controller is coupled to the voice processing path and a second echo controller is coupled to the noise processing path. A noise reducer is coupled to the output of the first echo controller and second echo controller.

The present invention further provides a device for use in a bi-directional communications system. The device includes a microphone array for receiving a near end audio signal, where the audio signal including a voice signal component and a noise signal component. The device further includes a speaker and a signal processing circuit. The speaker broadcasts to a near end user of the communication device an audio signal which is generated by a far end user. The signal processing circuit attenuates an echo signal generated by the speaker detected by the microphone array and attenuates background noise detected by the microphone array. The signal processing circuit comprises a voice beamformer adapted to detect the voice signal component, a noise beamformer adapted to detect a noise signal component, a first echo controller coupled to the output of the voice beamformer, a second echo controller coupled to the output of the noise beamformer, and a noise reducer coupled to the output of the echo controller.

The present invention further presents a method for processing a signal to reduce undesired noise. The method comprises receiving an audio signal with a microphone array, where the audio signal comprising one or more components. The audio signal is provided to a voice processing path having an input coupled to the microphone array and the voice processing path is adapted to detect voice signals. The audio signal is provided to a noise processing path having an input coupled to the microphone array and adapted to detect noise signals. An acoustic echo component in the audio signal is cancelled with a first echo controller coupled to the voice processing path. An acoustic echo component in the audio signal is cancelled with a second echo controller coupled to the noise processing path. A noise component in the audio signal is reduced with a noise reducer coupled to the output of the first echo controller and second echo controller.

DESCRIPTION OF THE DRAWINGS

The features and advantages of the apparatus and method of the present invention will be apparent from the following description in which.

DETAILED DESCRIPTION OF THE PREFERRED EMBODIMENTS

The present invention provides a solution to the needs described above through an apparatus and method for reducing acoustic echo and background noise. The invention utilizes beamforming techniques on a voice and noise signal together with echo cancellation techniques on a voice and noise signal with noise reduction algorithms.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

Figure 1:
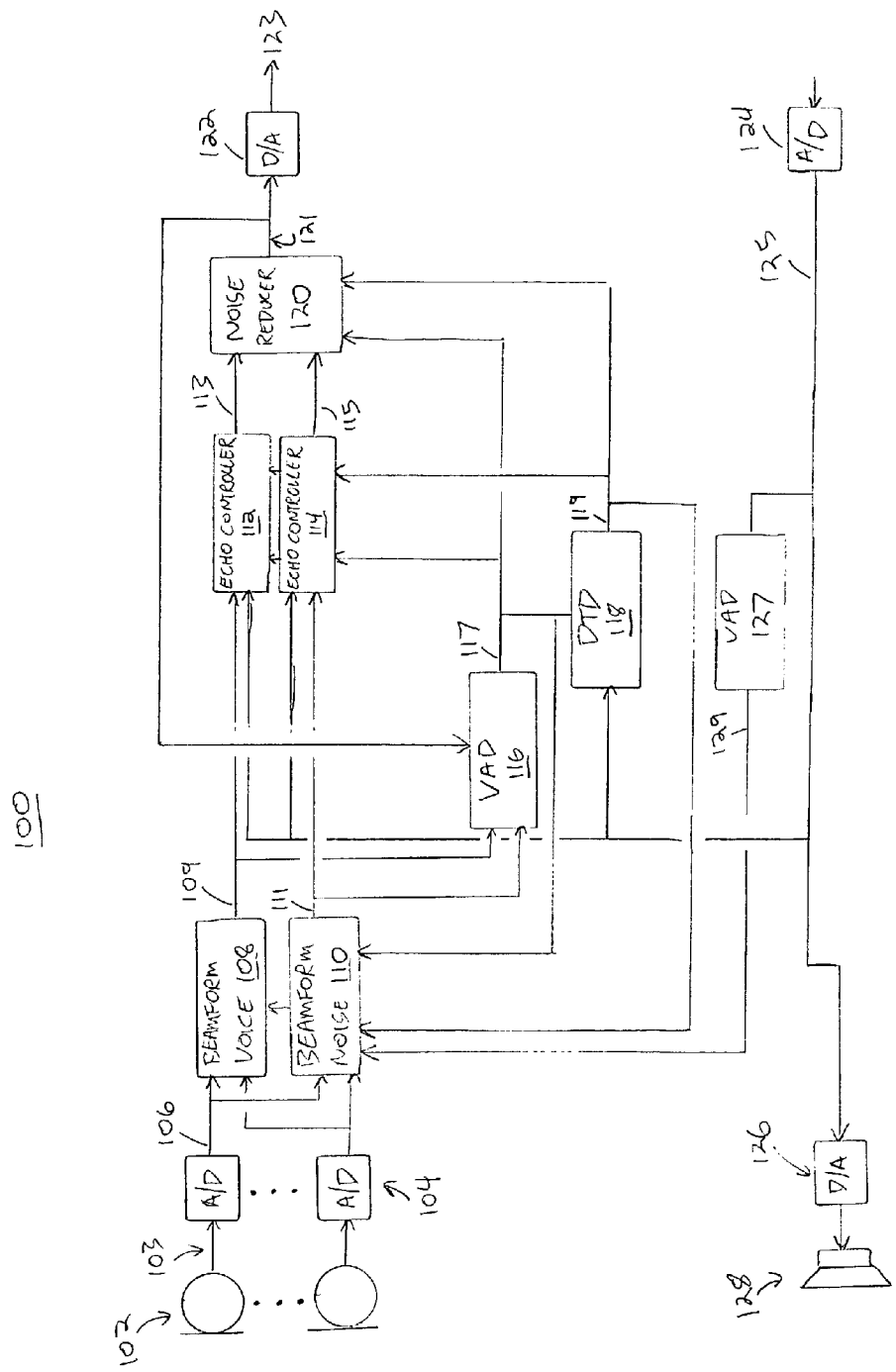
FIG. 1 is a diagram illustrating a presently preferred embodiment of the apparatus utilizing the invention.

Referring to FIG. 1, diagram of a basic configuration utilizing an embodiment of the apparatus for reduction of acoustic echo and background noise of the present invention is shown. The apparatus 100 of the present invention may be constructed using discrete components, such as microphones and digital signal processing (DSP) chips (and associated filters, A/D and D/A converters, power supplies, etc.). For simplicity of explanation, only a subset of elements is shown. The apparatus 100 includes a multi-element microphone array 102, analog to digital converters (A/D) 106, beamform voice processor 108, beamform noise processor 110, voice echo controller 112, noise echo controller 114, transmit (Tx) voice activity detector (VAD) 116, double talk detector 118, noise reducer 120, transmit output digital to analog (D/A) converter 122, far end receive input A/D 124, and far end receive (Rx) voice activity detector (VAD) 127. One of ordinary skill in the art will recognize that other architectures may be employed for the apparatus by changing the position of one or more of the various apparatus elements. For example, voice echo controller 112 and noise echo controller 114 may be situated between microphone array 102 and beamform voice processor 108 and beamform noise processor 110.

The speech of a far end user is converted to a digital far end signal 125 by analog to digital converter 124 and transmitted to a speaker 128 where it is output to a near end user. Prior to output by speaker 128 the digital far end signal 125 is converted to an analog audio signal by digital to analog converter 126. An alternate embodiment would couple the far end signal directly to the speaker 128 and utilize an A/D converter to present a digitized version of the far-end signal to echo controllers 112, 114 and double talk detector 118.

The speaker may be part of headsets, other hands free devices, handsets, or other telephonic device. In an embodiment of the invention, the headset is boomless. However, the headset may comprise a short or regular length boom. Although reference may be made herein to the use of a headset, e.g., headset speaker, this reference is meant to include other hands free devices, handsets, or other telephonic devices with speakers and microphones.

Microphone array 102 may comprise either omni-directional microphones, directional microphones, or a mix of omni-directional and directional microphones. Microphone array 102 detects the voice of a near end user which will be the primary component of the audio signal, and will also detect secondary components which may include the output of a headset or handset speaker and background noise. If omni-directional microphones are used, the microphone response pattern is affected by the mounting geometry within a headset packaging and by a wearer's head. The use of directional microphones is also possible, but will affect the performance of the beam forming algorithms used in a subsequent stage. These beam forming algorithms may have to be modified accordingly. In the instance of a two element array, if the elements are directional microphones, then one element is oriented towards the wearer's mouth and the other oriented away from the mouth.

Microphone array 102 comprises two or more microphones. Use of two microphones is beneficial to facilitate generation of high quality speech signals since desired vocal signatures can be isolated and destructive interference techniques can be utilized. Apparatus 100 may be implemented with any number of microphones. Those of ordinary skill in the art will appreciate that the inventive concepts described herein apply equally well to microphone arrays having any number of microphones and array shapes which are different than linear. The only impact on this generalization is the added cost and complexity of the additional microphones and their mounting and wiring, plus the added A/D converters, plus the added processing capacity (processor speed and memory) required to perform the beam forming functions on the larger array.

Each microphone in microphone array 102 is coupled to an analog to digital (A/D) converters 104. Analog near end signals 103 are output from microphone array 102. The individual microphone output near end signals 103 are applied to A/D converters 104 to form individual digitized signals 106. Transmission of voice by digital techniques has become widespread, particularly in cellular telephone and PCS applications. In a typical digital telephone system, speech is converted from an analog signal to a sampled stream of digital Pulse Code Modulated (PCM) samples by an A/D converter. In a typical embodiment, a date rate of 64 kbps is chosen in order to retain sufficient voice quality. Once the speech signal has been digitized, it can be manipulated to achieve certain benefits, such as beamforming, echo cancellation, and noise reduction. The digitized voice signal can be processed to remove undesired echo by an echo canceller and background noise suppressed by a noise reduction algorithm. As described further below, the near-end audio signal detected by microphone array 102 and converted by A/D converters 106 may comprise several signal components, including near end speech, near-end noise, and far-end echo.

There is one A/D converter for each microphone in the microphone array 102. The A/D converters 104 include anti-alias filters for proper signal preconditioning. Alternatively, the A/D conversion can be implemented using a single high speed converter with an analog N to 1 signal multiplexer in front of it to switch the analog signal from a specific channel onto the input of the ADC. A signal sampling mechanism is required for each microphone with sample timing synchronized in order to preserve the time delay information between microphones as required by the beamforming stage. While the invention can be implemented as a purely analog embodiment, it is considered simpler and therefore cheaper to implement it using digital signal processing (DSP) technology. One of ordinary skill in the art will recognize that purely analog implementations should be considered as merely an implementation variation of the same invention. A far end A/D converter 124 is provided for the incoming input receive signal from a far-end talker.

The individual A/D output signals 106 are applied to beamform voice processor 108 and beamform noise processor 110. Beamform voice processor 108 outputs enhanced voice signal 109 and beamform noise processor 110 outputs enhanced noise signal 111. The digitized output of microphone array 102 is electronically processed by beamform voice processor 108 and beamform noise processor 110 to emphasize sounds from a particular location and to de-emphasize sounds from other locations.

Beamformers are a form of spatial filter that receive inputs from an array of spatially distributed sensors and combines them in such a way that it either enhances or suppresses signals coming from certain directions relative to signals from other directions. As a result, the beamformer can alter the direction of sensitivity without movement of the sensor array. The input received from each sensor in the array are combined in a weighted manner to achieve the desired direction of sensitivity. The filter coefficients of a non-adaptive beamformer are predetermined such that the beamformer can form a beam (exhibit the greatest sensitivity) or a null (exhibit minimal sensitivity) in a predetermined direction. The filter coefficients of an adaptive beamformer are continually updated so that directional sensitivity can be dynamically changed depending on the changing locations or conditions associated with a target source, such as a user voice, and undesired sources, such as acoustic echo or background noise.

Electronic processing using beamforming makes it possible to electronically "steer" an array by emphasizing and/or de-emphasizing voice or noise sounds from objects as they move from location to location. Through the use of beamform voice processor 108, microphone array 102 can be advantageously used to pick up speech in situations such as teleconferences, where hands-free speech acquisition is desired, where there are multiple talkers or where there the talkers are moving. Through the use of beamforming and other such techniques, the array's directivity pattern can be updated rapidly to follow a moving talker or to switch between several alternating or simultaneous talkers. Beamform voice processor 108 may improve the voice signal to noise ratio by forming a composite antenna pattern beam in the direction of the voice and an antenna pattern null in the direction of one or more point noise sources. Through the use of beamform noise processor 110, the microphone array can be advantageously used to pick up point noise sources; the array's directivity pattern can be updated rapidly to follow a moving noise source or simultaneous noise sources.

Figure 2:
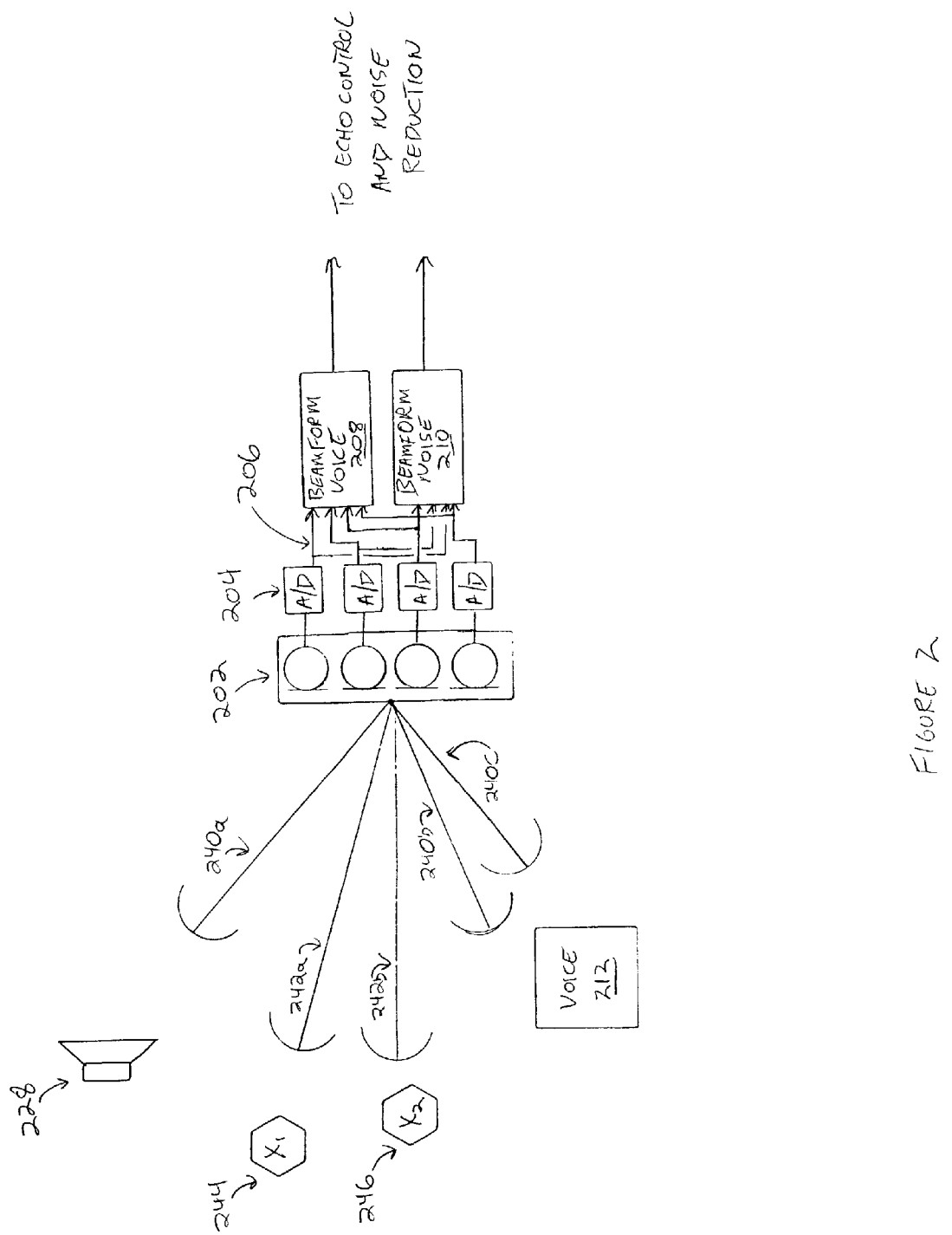
FIG. 2 is a diagram illustrating an embodiment of a beamformer utilized by the invention.

Referring to FIG. 2, a four microphone beamformer is shown. The beamformer includes a microphone array 202. One of ordinary skill in the art will recognize that other number of microphone beamformers may be selected. An embodiment including four microphones has been selected for the purposes of illustration only and should not be construed as limiting. Individual A/D output signals 206 are applied to beamform voice processor 208, which generates complex weights that are multiplied by the individual A/D output signals 206. The results are summed to produce an enhanced voice signal 109. Furthermore, in the present invention, individual A/D output signals 206 are applied to beamform noise processor 210, which generates complex weights that are multiplied by the individual A/D output signals 206. The results are summed to produce an enhanced noise signal 211. Operation of the beamform voice processor 208 and the beamform noise processor 210 are described in further detail below.

Referring to FIG. 2, beamform voice processor 208 receives the signals from A/D converters 204 and forms one or more beams or nulls 240*a*, 240*b*, and 240*c*. The beams are formed using conventional or adaptive beamforming techniques well known to those of ordinary skill in the art. Although three beams or nulls are shown, those of ordinary skill in the art will recognize that beamform voice processor 208 can form fewer or greater than the three beams or nulls and that the beams or nulls can be directed in any desired direction and not just in the directions shown in FIG. 2.

In further reference to FIG. 2, beamform noise processor 210 receives the signals from A/D converters 204 and forms one or more beams or nulls 242*a*, 242*b*. The beams are formed using conventional or adaptive beamforming techniques well known to those of ordinary skill in the art. Although two beams or nulls are shown, those of ordinary skill in the art will recognize that beamform noise processor 110 can form fewer or greater than the two beams or nulls and that the beams or nulls can be directed in any desired direction and not just in the directions shown in FIG. 2.

Beamform voice processor 208 isolates a near-end speaker voice 212. Beamform noise processor 210 isolates the noise from point noise sources such as X1 244 and X2 246 for noise reduction at subsequent stages of apparatus 100. One or more nulls may be directed at a headset speaker 228 to minimize the acoustic echo.

Referring to FIG. 1, in one embodiment both beamform voice processor 108 and beamform noise processor 110 are implemented as wide-band (pass band covers at least 300 to 3,300 Hz) beam formers, using any one of several common DSP algorithms as described in publications known to those of ordinary skill in the art and in sonar and radar applications. The beamformers may be either a fixed configuration, for lower cost, or adaptive for better performance. The voice beam former is configured to orient the main lobe of the beam formed response towards the wearer's mouth. An adaptive beam former is capable of adjusting the direction of the main lobe to compensate for different wearing positions encountered on different wearer's heads. This eliminates the need for the user to precisely position the headset on their head with respect to the mouth to headset orientation.

Use of adaptive beam formers can also adaptively place a null in one or more directions. This capability can be utilized to adaptively orient a null in the array response towards a major noise point source. If more than two microphones are used in the array, then several nulls can be adaptively oriented to reduce the response from several noise point sources. Additional nulls, if available, may be oriented towards the noise point sources, or else they may be oriented towards the headset speaker to reduce the acoustic echo perceived by the far-end talker. The acoustic echo is reduced, but not eliminated, utilizing beamformer nulls. Additional acoustic echo control is implemented in subsequent stages by the echo canceller. In the absence of a specific major noise point source, i.e. the noise is diffuse or reverberant, the nulls may be oriented in directions generally away from the mouth, or else towards the headset speaker to reduce the far-end talker's perceived acoustic echo. In the case of diffuse noise, the effectiveness of the noise beamformer is reduced but still advantageous.

The noise beam former is configured to place the main lobe of its output response away from the wearer's mouth. An adaptive beam former can adaptively orient the main lobe towards a major noise point source. In the absence of a specific major noise point source, i.e. the noise is diffuse, a broad main lobe is oriented in a direction generally away from the mouth. Again a null can be implemented, or several nulls for a larger array, in the output response of the noise beam former. This null is oriented towards the wearer's mouth, reducing the response from the wearer's own voice. Additional nulls, if available, may also be oriented towards the wearer's mouth or else they may be oriented towards the headset speaker, to reduce the acoustic echo perceived by the far-end talker.

Figure 3:
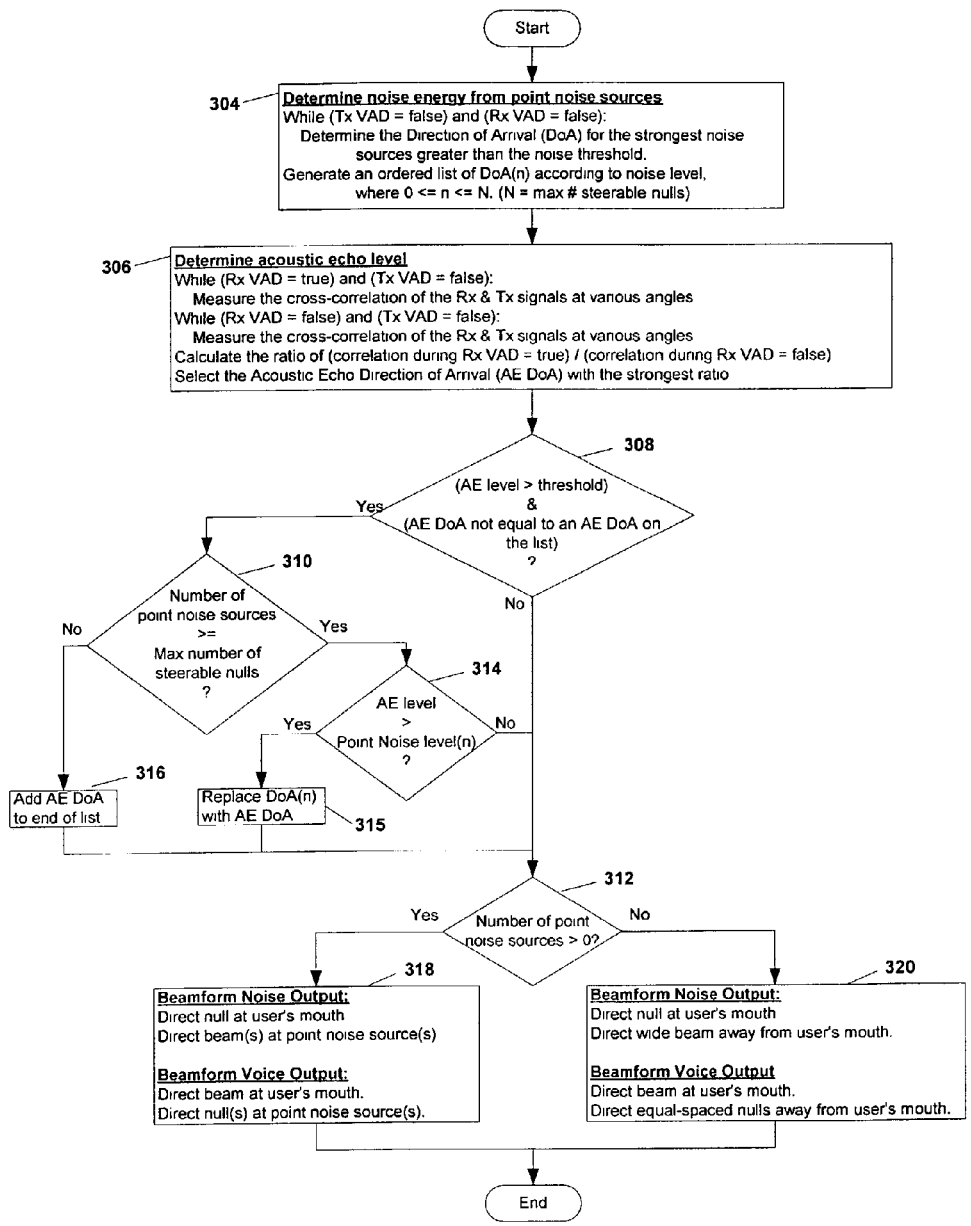
FIG. 3 is a flow chart illustrating an example method of operation of an adaptive voice beamformer and adaptive noise beamformer in directing beams and nulls.

Referring to FIG. 3 and FIG. 2, a method of operation of an adaptive voice beamformer 208 and adaptive noise beamformer 210 in directing beams and nulls is illustrated. One of ordinary skill in the art will recognize that the direction of the beams and nulls as described in FIG. 3 is only illustrative, and other configurations of beams and nulls can be utilized by beamform voice processor 208 and beamform noise 210 in addition to that described in FIG. 3. At step 304, the noise energy level from point noise sources is determined as follows. While (Tx VAD=false) and (Rx VAD=false): (1) Determine the Direction of Arrival (DoA) for the strongest noise sources greater than a noise threshold, and (2) generate an ordered list of DoA(n) according to the noise level, where 0<=n<=N (N is equal to the maximum number of steerable nulls). These determinations and others described below can be made by a processor separate (not shown) from the beamform voice processor 208 and beamform noise processor 210, or as part of the function of the beamform voice processor 208 or beamform noise processor 210.

At step 306, the acoustic echo level is determined as follows. While (Rx VAD=true) and (Tx VAD=false): measure the cross-correlation of the Rx and Tx signals at various angles. While (Rx VAD=false) and (Tx VAD=false): measure the cross-correlation of the Rx and Tx signals at various angles. The ratio of (correlation during Rx VAD=true)/(correlation during Rx VAD=false) is calculated. The Acoustic Echo Direction of Arrival (AE DoA) with the strongest ratio is selected.

At step 308, a determination is made whether the acoustic echo noise level is greater than the noise threshold and whether the AE DoA is not equal to an AE DoA on the list. If yes, at step 310 a determination is made whether the number of point noise sources is greater than or equal to the maximum number of steerable nulls. If no at step 308, at step 312 it is determined whether the number of point sources is greater than zero.

If yes at step 310, at step 314 it is determined whether the AE noise level is greater than point noise level (n). If no at step 310, at step 316 AE DoA is added to the end of the list. If yes at step 314, DoA(n) is replaced with Acoustic Echo DoA at step 315. If no at step 314, at step 312 it is determined whether the number of point sources is greater than zero.

If yes at step 312, at step 318 the beamform noise output directs a null at the user's mouth and directs beam(s) at point noise source(s). The beamform voice output directs a beam at the user's mouth and directs null(s) at point noise source (s). If no at step 312, at step 320 the beamform noise output directs a null at the user's mouth and directs a wide beam away from the user's mouth. The beamform voice output directs a beam at the user's mouth and directs equal-spaced nulls away from the user's mouth.

In an alternative embodiment where there are limited beams and/or nulls available, an adaptive algorithm may balance the noise energy level from the headset speaker against the diffuse noise energy level to determine the strength of the null to direct toward the headset speaker. In a further alternative embodiment, an adaptive algorithm balances the noise energy level from the headset speaker against the energy from one or more distinct point noise sources to determine the appropriate weighting to place beams and nulls in particular directions. The determined weighting may be adaptively updated as point noise sources or acoustic echo changes. The adaptive algorithm maximizes the voice to noise ratio, where the noise comprises point noise sources, diffuse noise, and acoustic echo. This voice to noise ratio is also maximized in subsequent echo cancellation and noise reduction stages.

Referring to FIG. 1, the output of beamform voice processor, enhanced voice signal 109, and the output of beamform noise processor 110, enhanced noise signal 111, are propagated to voice activity detector (VAD) 116.

Voice activity detector 116 determines when the headset user is speaking and when the user is silent (i.e., whether the signals 109 and 111 include voice or only noise). A binary output "Voice/No Voice" signal 117 is output and used by other stages to control the echo cancellation and transmit noise reduction adaptation algorithms. It can also be used in an adaptation control algorithm of beamform voice processor 108 and beamform noise processor 110 to determine what the headset user's voice is and what is noise emanating from an angle close to the user's mouth. VAD functions are well known in the telephony literature and are standardized for use with specific cellular telephony codecs, such the VAD function described in ETSI TS 126 094 for the AMR codec for the GSM cellular telephone system, or for VoIP applications such as the VAD function defined in ITU-T Recommendation G.729, Annex B. Alternatively, a VAD function may use a separate VAD sensor to detect when the headset wearer is speaking. The use of both enhanced voice signal 109 and enhanced noise signal 111 to increase voice activity detection accuracy allows for enhanced double talk detection, echo cancellation, and noise reduction.

In an embodiment of the invention, the output of noise reducer 120 is input to voice activity detector 116, as shown in FIG. 1. This provides a better SNR voice signal to the VAD function, but at the cost of the additional latency through the noise reduction function to the VAD function. This additional delay can cause the VAD function to signal the start or end of voice activity later than normal, which affects the accuracy in the VAD start and end transition regions. In the worst case, this can cause the VAD function to oscillate. Accordingly, when the noise reduction output is fed back into the VAD input, care must be taken to reduce the additional VAD detection latency and the risk of instability.

The voice/no voice signal 117 output from voice activity detector 116 is input to double talk detector 118, noise reducer 120, echo controller 114, and beamform noise processor 110.

Far-end signal 125 is output by far-end receive input A/D converter 124. The receive input corresponds to a voice signal from a speaker at a location remote from the near end speaker. Far end signal 125 is input to double talk detector (DTD) 118 along with voice/no voice signal 117. Rx voice activity detector 127 determines when the far end user is speaking and when the user is silent. A binary output "Voice/No Voice" signal 129 is output and is provided to beamform voice processor 108 and beamform noise processor 110. Signal 129 may also be provided directly to DTD 118.

Double talk detector 118 outputs a "Double Talk/No Double Talk" binary signal 119. Double talk occurs when both a near end user and far end user are speaking simultaneously. The double talk/no double talk signal 119 is used by the echo cancellers to halt the echo control adaptation when both the headset wearer and the far-end talker are speaking at the same time. The double talk/no double talk signal 119 is also provided to beamform voice processor 108 and beamform noise processor 110. It can be used similarly by the transmit noise reduction stage for a similar purpose. DTD functions are also well known in the telephony literature, such as the DTD described in ITU-T Recommendation G.168.

Referring to FIG. 1, the output of beamform voice processor 108, enhanced voice signal 109, is also propagated along a voice processing path to voice echo controller 112. The output of beamform noise processor 110, enhanced noise signal 111, is propagated along a noise processing path to noise echo controller 114. Far end signal 125 is provided to echo controller 112, 114 as a reference signal. The signal voice/no voice signal 117 and double talk/no double talk signal 119 are also input to echo controller 112, 114.

Voice echo controller 112 and noise echo controller 114 are modifications of a standard echo controller configuration known to those of ordinary skill in the art similar to the acoustic echo cancellers described in ITU-T Recommendation G.167, with the echo response times and memory modified for headset and handset acoustic echo applications. In an embodiment of the invention, echo controllers 112, 114 are configured in digital signal processor form programmed to function in accordance with the teachings herein. The echo cancellers use the outputs of the VAD and DTD to control the echo adaptation. The output of the voice echo controller is an echo controlled voice signal 113 with reduced echo from speaker 128, which is provided to noise reducer 120. The output of the noise echo controller 114 is an echo controlled noise signal 115 with reduced echo from speaker 128, which is also provided to noise reducer 120.

Enhanced voice signal 109 and enhanced noise signal 111 contain an echo signal component resulting from output of the far end signal 125 output from a headset speaker 128 being detected by microphone array 102. Echo controllers 112, 114 are used to cancel the echo signal component. The headset output from the headset speaker propagates through the air and other mechanical vibration paths between the headset speaker and microphone array 102, potentially reflecting off one or more surfaces and changing in direction, frequency, phase or amplitude before being detected by microphone array 102. Microphone array 102 is intended to detect the near end user voice. Echo controllers 112, 114 remove signal components in signals 106 resulting from coupling of acoustic and mechanical energy from the headset speaker.

In an embodiment of the invention echo controllers 112, 114 are implemented using an adaptive filter with a dynamically updated transfer function T. The transfer function T associated with the path from the headset speaker to the microphone array should be continually updated to account for changing conditions, such as the relative position of the headset speaker and microphone array. A coefficient calculation block within echo controllers 112, 114 continuously calculates new values for the filter coefficients to adapt to changes in the characteristics of the echo path. There are several algorithms for updating filter coefficients that are known to those of ordinary skill in the art. The adaptive filter approximates the echo path using far end signal 125, compensating for the delay in the far end signal in propagating through A/D converter 124, other components prior to being output by the headset speaker, and the acoustic path between the headset speaker and microphone array. Echo controllers 112, 114 utilize a summing/subtracting device to subtract the generated estimate of the echo signal component from enhanced voice signal 109 and enhanced noise signal 111. Although the acoustic echo in enhanced voice signal 109 and enhanced noise signal 111 is reduced, not all of the echo will necessarily be removed.

In an embodiment of the invention, echo controllers 112, 114 detect which of several talk states the speakers are engaged. The talk states include near-end speech only, far-end speech only, both near-end and far-end speech simultaneously (double talk), and neither speaker talking. If echo controllers 112, 114 receive a double talk signal from double talk detector 118 indicating a double talk state, the coefficients of the adaptive filter are frozen in order to prevent the filter model from deteriorating.

Echo controlled voice signal 113 and echo controlled noise signal 115 are input to noise reducer 120. Double talk/no double talk signal 119 output from double talk detector 118 and voice/no voice signal 117 output from voice activity detector 116 are also input to noise reducer 120.

Beamformer and echo canceller preprocessing enhances the quality of both the voice signal and the noise signal prior to their use in the noise reducer. The performance of many noise reduction algorithms, particularly Widrow-Hoff noise subtraction, spectral noise subtraction, and blind source separation, is improved if the voice signal and noise signal inputs are cleaner representations of the different sources, or speaking mathematically, if the input signals are orthogonal, or "quasi-orthogonal", to each other. The more orthogonal they are, the better the noise reduction algorithm can operate. Preprocessing both the voice and the noise signals enhances the orthogonality of the two signals before they are used in the noise reduction stage. This provides better noise reduction performance with fewer voice artifacts as perceived by the far-end listener.

Noise reducer 120 may comprise any combination of several noise reduction techniques known in the art to enhance the vocal to non-vocal signal quality and provide the final digital output signal 121. Noise reducer 120 utilizes the conditioned noise signal and to obtain the highest quality noise signal to maximize performance of the noise reduction algorithms. Each noise reduction technique may address different noise artifacts present in the voice and noise signal. Such techniques may include, but are not limited to, any combination of the following:

(1) Noise subtraction, where the noise signal is processed and subtracted from the voice signal, including several Widrow-Hoff style noise subtraction techniques where the voice amplitude and the noise amplitude are adaptively adjusted to minimize the combination of the output noise and the voice aberrations. A model of the noise signal is generated and utilized to cancel the noise signal in the signal detected by the microphone array. If there are multiple noise sources, the synthesized noise model is an amalgamation of the combination of the noise sources, where all the noise sources combined are treated as one noise source.

(2) Dynamic gain control, "noise gating" the output during unvoiced periods. When the near end speaker is silent, there is no output to the far end and therefore the far end user does not hear background noise or acoustic echo.

(3) Spectral subtraction, where the voice and noise signals are decomposed into their separate frequency components and adaptively subtracted on a weighted basis. The weighting may be calculated in an adaptive fashion using an adaptive feedback loop.

(4) Formant tracking, where the peaks of the voice formants are detected and enhanced in the voice spectrum.

(5) Independent Component Analysis (ICA), including Blind Source Separation (BSS).

Noise reducer 120 directly utilizes both the noise signal and voice signal inputs for noise subtraction, spectral subtraction, and blind source separation noise reduction algorithms. Both the noise signal and voice signal are utilized to better implement dynamic gain control and formant tracking noise reduction algorithms by determining what is voice and what is noise in order to distinguish when a user is speaking and when a user is silent.

Figure 4:
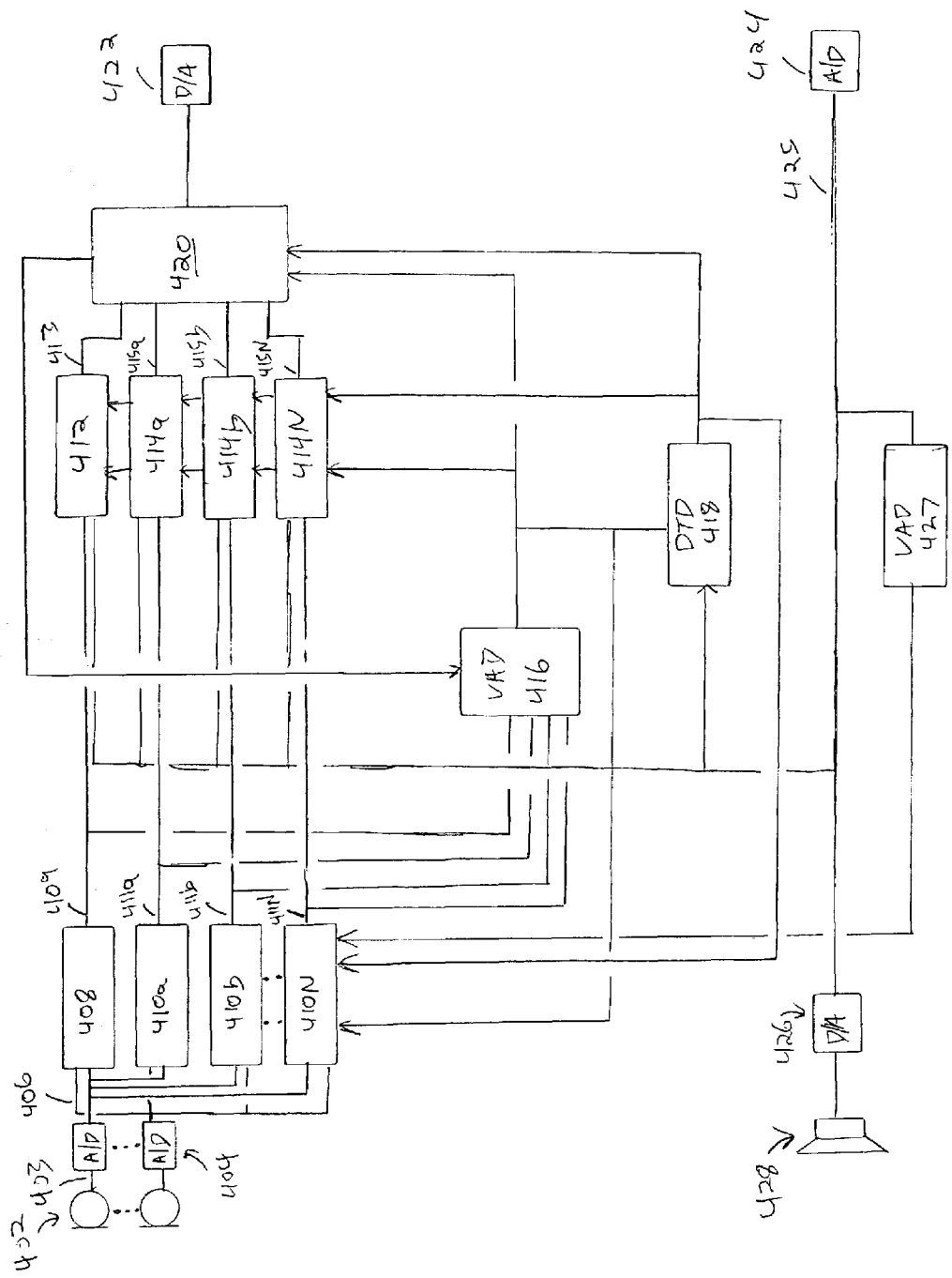
FIG. 4 is a diagram illustrating an embodiment of an apparatus for noise reduction using blind source separation noise reduction.

When multiple noise sources are present, blind source separation techniques are particularly effective in reducing noise. Referring to FIG. 4, an embodiment of the invention is shown illustrating an apparatus for noise reduction using blind source separation noise reduction. The apparatus 400 includes a multi-element microphone array 402, analog to digital converters (A/D) 406, beamform voice processor 408, beamform noise processor 410a, beamform noise processor 410b, . . . beamform noise processor 410N, voice echo controller 412, noise echo controller 414a, noise echo controller 414b, . . . noise echo controller 414N, transmit voice activity detector 416, double talk detector 418, noise reducer 420, transmit output digital to analog (D/A) converter 422, far end receive input A/D 424, and far end receive voice activity detector 427. One of ordinary skill in the art will recognize that other architectures may be employed for the apparatus by changing the position of one or more of the various apparatus elements.

The individual A/D output signals 406 are applied to beamform voice processor 408, beamform noise processor 410a, beamform noise processor 410b, . . . beamform noise processor 410N. Beamform voice processor 408 outputs enhanced voice signal 409 and beamform noise processor 410 outputs enhanced noise signal 411a, enhanced noise signal 411b, . . . , enhanced noise signal 411N. The digitized output of microphone array 402 is electronically processed by beamform voice processor 408 and beamform noise processor 410 to emphasize sounds from a particular location and to de-emphasize sounds from other locations. Through the use of beamform noise processor 410a, beamform noise processor 410b, . . . , beamform noise processor 410N, microphone array 402 can be advantageously used to detect multiple point noise sources. Each beamform noise processor is used to focus on a different point noise source and can be updated rapidly to isolate additional noise sources so long as the number of noise sources is equal to or less than the number of noise beamformers N.

The output of beamform voice processor 408, enhanced voice signal 409, is also propagated along a voice processing path to voice echo controller 412. The output of beamform noise processor 410a, beamform noise processor 410b, . . ., beamform noise processor 410N is propagated along a noise processing path to noise echo controller 414a, noise echo controller 414b, . . . , noise echo controller 414N. Echo controlled voice signal 413 and echo controlled noise signal 415a, 415b, . . . , 415N are input to noise reducer 420.

Additional components in FIG. 4 operate in a manner comparable to that described in reference to FIG. 1 above.

Microphone array 402 receives signals from a voice source and one or more noise sources. The noise reducer 420 includes a blind source separation algorithm, as further described herein, that separates the signals of the noise sources from the different mixtures of the signals received by each microphone in microphone array 402. The blind source separation process separates the mixed signals into separate signals of the noise sources, generating a separate model for each noise source utilizing noise signal 415a, 415b, . . . , 415N.

The output of noise reducer 120 is provided to D/A converter 122 to provide an analog audio signal 123 which has substantially isolated voice and reduced noise and echo due to the beamforming, echo cancellation, and noise reduction techniques described herein. D/A converter 122 includes anti-alias filters required for proper signal reconstruction.

This embodiment uses the features provided from several different signal processing technologies in a synergistic combination to provide an optimal voice output with minimal microphone background noise and minimal acoustic echo from the receive signal. A judicious combination of signal processing technologies is utilized with a microphone array to provide optimal echo control and background noise reduction in the transmit output signal.

In a further embodiment of the invention, the input data is converted from the time domain to the frequency domain utilizing an algorithm such as a Fast Fourier Transform (FFT). In the frequency domain the convolved processes of beamforming, echo control and noise reduction become simple addition functions instead of convolutions. In this embodiment the output of the final frequency domain step is transformed back to the time domain via an algorithm such as an Inverse Fast Fourier Transform (IFFT). Commercially available digital signal processor such as dsp factory's BelaSigna family, Texas Instruments TMS320C5400 family or Analog Devices ADSP 8190 family of products can be utilized to efficiently implement frequency domain processing and the required domain transforms.

Furthermore, the echo controller functions and beamforming function can be reversed and still operate within the spirit of the invention, as both functions are linear or near-linear operations. The advantage of one configuration, as opposed to the other, is the number of echo controllers functions to be implemented is equal to the number of microphones. For a large microphone array, the amount of processing can become limiting.

Beamformers, echo controllers and noise reducers can be implemented as separate stages or convolved together in any combination as a single stage when implemented as linear processes. Convolving them together has the advantage of reducing the amount of processing required in the implementation, which reduces the cost, and it can reduce the end-to-end delay, also known as latency, of the implementation. This is useful for user comfort in telephony applications. Convolving them together requires a greater dynamic range. Commercially available digital signal processors such as processors in Texas Instruments family TMS 320C54xx or Analog devices ADSP family 819x can be utilized to implement the required signal processing.

Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. An apparatus for processing a signal comprising:
    a microphone array for receiving an audio signal, the audio signal including a voice signal component and a noise signal component;
    a voice processing path having an input coupled to the microphone array, wherein the voice processing path comprises a beamform voice processor adapted to detect voice signals;
    a noise processing path having an input coupled to the microphone array, wherein the noise processing path comprises a beamform noise processor adapted to detect noise signals;
    a first echo controller coupled to the voice processing path, wherein the first echo controller determines a near end speech talk state, a far-end speech talk state, a no speech talk state, or both a near-end and far-end speech talk state, wherein a first echo controller output comprises a voice signal with reduced echo;
    a second echo controller coupled to the noise processing path, wherein the second echo controller determines the near end speech talk state, the far-end speech talk state, the no speech talk state, or both the near-end and far-end speech talk state, the second echo controller comprising:
        an adaptive filter for generating an approximated echo signal in the audio signal; and
        a subtractor for subtracting the approximated echo signal from an output of the noise processing path, wherein the output of the second echo controller is a noise signal with reduced echo;
    a noise reducer coupled to the output of the first echo controller and second echo controller, wherein the noise reducer utilizes the noise signal with reduced echo and the voice signal with reduced echo in a noise reduction process to generate an output signal with reduced noise; and
    a first voice activity detector, wherein the first activity detector receives a beamform voice processor output, beamform noise processor output, and the output signal with reduced noise from the noise reducer, and the first voice activity detector outputs a first voice/no voice signal to the noise reducer; and
    a second voice activity detector, wherein the second activity detector receives a far end audio signal, and the second voice activity detector outputs a second voice/no voice signal to the beamform voice processor and the beamform noise processor.

2. The apparatus of claim 1, wherein the first echo controller comprises:
    a first adaptive filter with adaptive weights for generating a first approximated echo signal in the audio signal; and
    a first subtractor for subtracting the first approximated echo signal from an output of the voice processing path, wherein the output of the first echo controller is a voice signal with reduced echo.

3. The apparatus of claim 1 further comprising an analog to digital converter for processing the audio signal to generate a digitized signal.

4. The apparatus of claim 1, wherein the audio signal is a signal in a bi-directional communications system, and wherein the noise signal component comprises an acoustic echo signal or background noise.

5. The apparatus of claim 4, wherein the voice signal is generated by a near end user of a near-end communication device speaking into the microphone array, the acoustic echo signal is an echo signal generated by a speaker of the near end communication device broadcasting a voice signal generated by a far end user of a far-end communication device.

6. The apparatus of claim 1, further comprising a double talk detector coupled to the output of far end communication device and the output of the first voice activity detector and the second voice activity detector for determining when the near end user and far end user are simultaneously speaking, wherein the output of the double talk detector is provided to the first and second echo controller and the noise reducer.

7. The apparatus of claim 1, wherein the voice processing path, noise processing path, first echo controller, second echo controller, and noise reducer are implemented by a digital signal processor.

8. The apparatus of claim 1, wherein the apparatus is implemented in a hands-free communication device.

9. The apparatus of claim 1, wherein the apparatus is implemented in a mobile communication device.

10. The apparatus of claim 1, wherein the noise reducer utilizes a noise cancellation algorithm.

11. An apparatus for processing a signal comprising:
    a means for receiving an audio signal, the audio signal including a voice signal component and a noise signal component;
    a means adapted for detecting the voice signal component;
    a means adapted for detecting the noise signal component;
    a means for canceling a first echo component in the voice signal component to generate a voice signal component with reduced echo comprising determining a near end speech talk state, a far-end speech talk state, a no speech talk state, or both a near-end and far-end speech talk state;
    a means for canceling a second echo component in the noise signal component to generate a noise signal component with reduced echo comprising determining the near end speech talk state, the far-end speech talk state, the no speech talk state, or both the near-end and far-end speech talk state;
    a means for reducing noise in the audio signal using the voice signal component with reduced echo and the noise signal component with reduced echo to generate an optimized voice signal with reduced noise;
    a first voice activity detecting means for receiving the voice signal component with reduced echo, the noise signal component with reduced echo, and the optimized voice signal with reduced noise, and for outputting a first voice/no voice signal to the noise reducer; and
    a second voice activity detecting means for receiving a far end audio signal and outputting a second voice/no voice signal to the means adapted for detecting the voice signal component and the means adapted for detecting the noise signal component.

12. A communication device for use in a bi-directional communications system comprising:

a microphone array for receiving a near end audio signal, the audio signal including a voice signal component and a noise signal component;

a speaker for broadcasting to a near end user of the communication device a far-end audio signal which is generated by a far end user and received at the communication device; and a signal processing circuit for attenuating an echo signal generated by the speaker detected by the microphone array and for attenuating background noise detected by the microphone array, wherein the signal processing circuit comprises a voice beamformer adapted to detect the voice signal component, a noise beamformer adapted to detect a noise signal component, a first echo controller coupled to the output of the voice beamformer wherein the first echo controller determines a near end speech talk state, a far-end speech talk state, a no speech talk state, or both a near-end and far-end speech talk state, wherein a first echo controller output comprises a voice signal with reduced echo, a second echo controller coupled to the output of the noise beamformer, wherein the second echo controller determines the near end speech talk state, the far-end speech talk state, the no speech talk state, or both the near-end and far-end speech talk state, and a noise reducer coupled to the output of the first echo controller and the second echo controller, wherein the second echo controller comprises:

an adaptive filter for generating an approximated echo signal in the audio signal; and a subtractor for subtracting the approximated echo signal from an output of the noise beamformer, wherein the output of the second echo controller is a noise signal with reduced echo, and wherein the noise reducer utilizes the noise signal with reduced echo and the voice signal with reduced echo in a noise reduction process to generate an output signal with reduced noise;

a first voice activity detector, wherein the first activity detector receives a voice beamformer output, noise beamformer output, and the output signal with reduced noise from the noise reducer, and the first voice activity detector outputs a first voice/no voice signal to the noise reducer; and a second voice activity detector, wherein the second activity detector receives a far end audio signal, and the second voice activity detector outputs a second voice/no voice signal to the voice beamformer and the nose beamformer.

13. The apparatus of claim 12, wherein the first echo controller comprises:

a first adaptive filter with adaptive weights for generating a first approximated echo signal in the audio signal; and a first subtractor for subtracting the first approximated echo signal from an output of the voice beamformer, wherein the output of the first echo controller is a voice signal with reduced echo.

14. The apparatus of claim 12, wherein the signal processing circuit further comprises an analog to digital converter for processing the audio signal to generate a digitized signal.

15. The apparatus of claim 12, wherein the signal processing circuit further comprises a double talk detector that receives the far end audio signal and is coupled to the output of the first voice activity detector and the second voice activity detector, wherein the double talk detector determines when the near end user and far end user are simultaneously speaking, and wherein the output of the double talk detector is provided to the first and second echo controller and the noise reducer.

16. The apparatus of claim 12, wherein the signal processing circuit is implemented by a digital signal processor.

17. The apparatus of claim 12, wherein the noise reducer utilizes a noise cancellation algorithm.

18. A method for processing a signal to reduce undesired noise, the method comprising:

receiving an audio signal with a microphone array, the audio signal comprising one or more components;

providing the audio signal to a voice processing path comprising a voice beamform processor having an input coupled to the microphone array and adapting the voice processing path to detect voice signals;

providing the audio signal to a noise processing path comprising a noise beamform processor having an input coupled to the microphone array and adapting the noise processing path to detect noise signals;

canceling an acoustic echo component in the audio signal with a first echo controller coupled to the voice processing path comprising determining a near end speech talk state, a far-end speech talk state, a no speech talk state, or both a near-end and far-end speech talk state;

outputting a voice signal with reduced echo from the first echo controller;

canceling an acoustic echo component in the audio signal with a second echo controller coupled to the noise processing path, comprising:

determining the near end speech talk state, the far-end speech talk state, the no speech talk state, or both the near-end and far-end speech talk state;

generating an approximated echo signal in the audio signal; and subtracting the approximated echo signal from a noise signal component on the noise processing path;

outputting a noise signal with reduced echo from the second echo controller;

processing the voice signal with reduced echo and the noise signal with reduced echo with a noise reducer coupled to the output of the first echo controller and the second echo controller to generate an output signal with reduced noise;

inputting to a first voice activity detector a voice beamform processor output, a noise beamform processor output, and the output signal with reduced noise;

outputting from the first voice activity detector a first voice/no voice signal to the noise reducer;

inputting to a second voice activity detector a far end audio signal; and outputting from the second activity detector a second voice/no voice signal to the beamform voice processor and beamform noise processor.

19. The method of claim 18, wherein adapting the voice processing path to detect voice signals comprises:

weighting the audio signal with adaptive complex weighting coefficients selected to form one or more beams or nulls to detect voice signals.

20. The method of claim 18, wherein adapting the noise processing path to detect noise signals comprises:

weighting the audio signal with adaptive complex weighting coefficients selected to form one or more beams or nulls to detect noise signals.

21. The method of claim 18, wherein canceling an acoustic echo component in the audio signal with a first echo controller comprises:

generating a first approximated echo signal in the audio signal; and subtracting the first approximated echo signal from an output of the first echo controller, wherein the output of the first echo controller is a voice signal with reduced echo.

22. The method of claim 18, further comprising processing the audio signal to generate a digitized signal.

23. The method of claim 18, further comprising determining whether the audio signal contains a voice signal corresponding to a near end user.

24. The method of claim 18, further comprising determining when a near end user and a far end user are simultaneously speaking.

* * * * *